United States Patent
Sharma et al.

(10) Patent No.: US 8,074,069 B2
(45) Date of Patent: Dec. 6, 2011

(54) READING A LOCKED WINDOWS NFTS EFS ENCRYPTED COMPUTER FILE

(75) Inventors: Anurag Sharma, Mt View, CA (US); Mark Andrew Smith, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 1360 days.

(21) Appl. No.: 11/067,570

(22) Filed: Feb. 24, 2005

(65) Prior Publication Data

US 2006/0190722 A1 Aug. 24, 2006

(51) Int. Cl.
*H04L 29/06* (2006.01)

(52) U.S. Cl. .......... 713/165; 380/3; 380/4; 380/49; 380/71; 380/190; 380/286; 380/259; 705/71; 707/1; 707/103; 707/200; 707/205; 709/203; 709/24; 709/229; 709/213; 709/217; 709/225; 711/114; 713/164; 713/193; 713/201

(58) Field of Classification Search .......... 713/165
See application file for complete search history.

(56) References Cited

U.S. PATENT DOCUMENTS

| | | | |
|---|---|---|---|
| 5,659,614 A | | 8/1997 | Bailey, III |
| 5,689,706 A | * | 11/1997 | Rao et al. ............ 707/201 |
| 6,185,681 B1 | * | 2/2001 | Zizzi ............ 713/165 |
| 6,249,866 B1 | * | 6/2001 | Brundrett et al. ............ 713/165 |
| 6,405,315 B1 | * | 6/2002 | Burns et al. ............ 713/190 |
| 6,615,349 B1 | * | 9/2003 | Hair ............ 713/165 |
| 7,051,212 B2 | * | 5/2006 | Ginter et al. ............ 713/193 |
| 7,167,982 B2 | * | 1/2007 | Elliott et al. ............ 713/164 |
| 7,380,246 B2 | * | 5/2008 | Reed et al. ............ 718/100 |
| 2002/0016912 A1 | | 2/2002 | Johnson |
| 2002/0081995 A1 | | 6/2002 | Leppinen et al. |
| 2002/0099666 A1 | * | 7/2002 | Dryer et al. ............ 705/71 |
| 2003/0088783 A1 | | 5/2003 | DiPierro |
| 2004/0049700 A1 | | 3/2004 | Yoshida |
| 2004/0091114 A1 | * | 5/2004 | Carter et al. ............ 380/259 |
| 2004/0153642 A1 | * | 8/2004 | Plotkin et al. ............ 713/150 |
| 2005/0005138 A1 | | 1/2005 | Awai |

* cited by examiner

*Primary Examiner* — Nathan Flynn
*Assistant Examiner* — Bryan Wright
(74) *Attorney, Agent, or Firm* — Leonard T. Guzman; Mohammed Kashef

(57) ABSTRACT

Embodiments of the invention relate to reading at least one locked, encrypted computer file encrypted by an encryption filter driver running on an operating system of a computer system, with an added kernel driver, while the operating system is running and reading at least one locked, unencrypted computer file in a computer system with an operating system with an added kernel driver while the operating system is running. An exemplary embodiment includes getting the handle of the locked, encrypted computer file, causing encryption key information associated with the locked, encrypted computer file to be processed, and reading data from the locked, encrypted computer file by using the added kernel driver.

10 Claims, 21 Drawing Sheets

READING A LOCKED WINDOWS NFTS EFS ENCRYPTED COMPUTER FILE

FIELD OF THE INVENTION

Figure 1A:
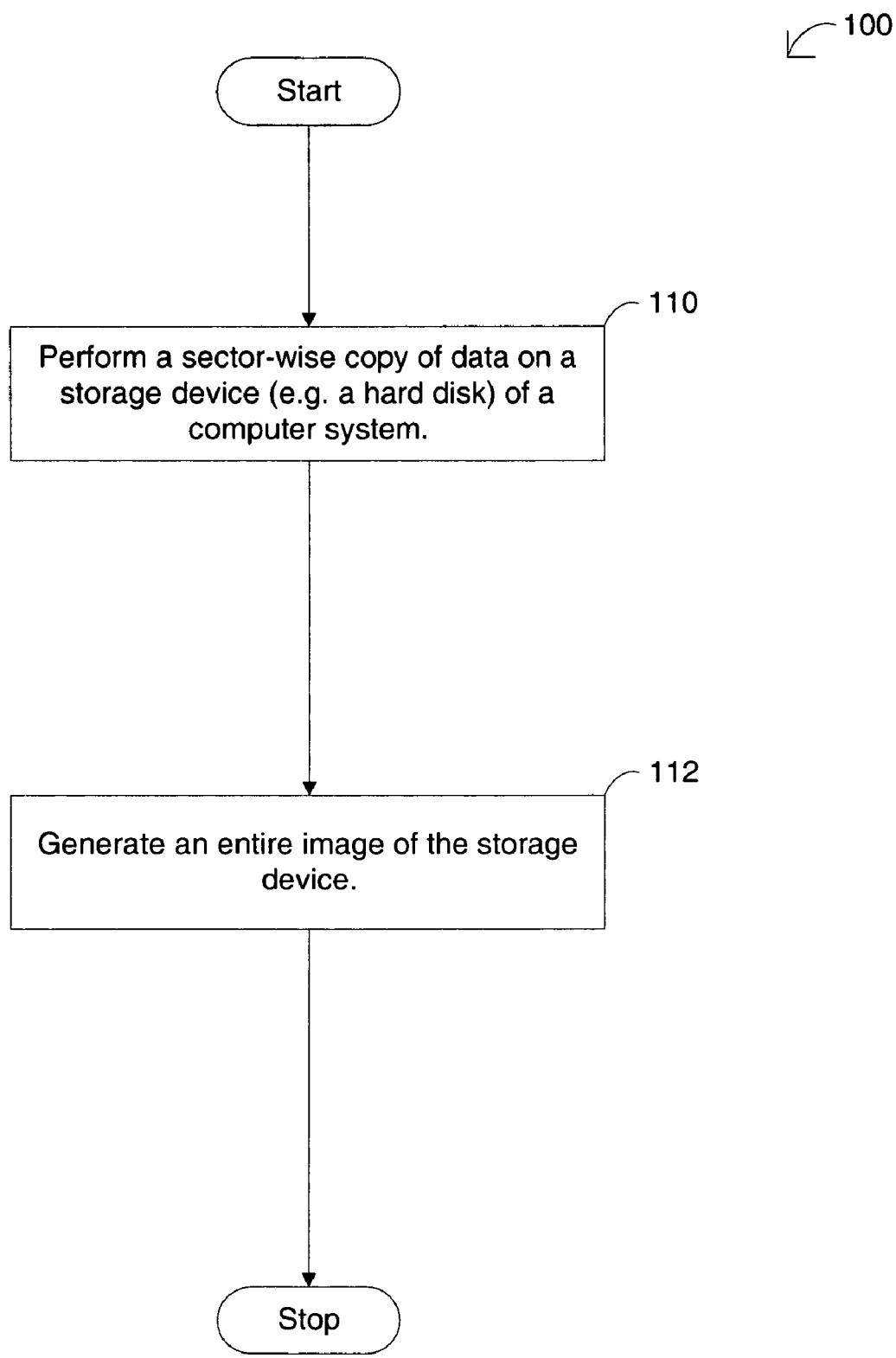

The present invention relates to reading at least one locked, encrypted computer file encrypted by an encryption filter driver running on an operating system of a computer system, with an added kernel driver, while the operating system is running and reading at least one locked, unencrypted computer file in a computer system with an operating system with an added kernel driver while the operating system is running.

BACKGROUND OF THE INVENTION

Encrypting Computer Files

A computer system may include an encryption filter driver which runs on an operating system of the computer system. For example, MICROSOFT has an encryption filter driver that is part of MICROSOFT'S New Technology File System (hereinafter "NTFS") Encrypting File System (hereinafter "EFS") that runs on MICROSOFT'S WINDOWS operating system of a computer system. In addition, the kernel of an operating system of a computer system and processes and programs running on the computer system can encrypt computer files on the computer system via the encryption filter driver. For example, the WINDOWS kernel and WINDOWS processes and programs accessing computer files on the NTFS EFS have the ability to encrypt computer files to prevent their contents from being interpreted by another user via the NTFS EFS filter driver which is encapsulated in NTFS.

Locking Computer Files

In addition, the kernel of an operating system of a computer system and processes and programs running on the computer system can lock (i.e. protect) computer files on the computer system.

Locking at File-Open Time

One type of locking is locking at file-open time. For example, the WINDOWS kernel and WINDOWS processes and programs have the ability to lock computer files from being opened and read by other processes by locking (i.e. protecting) the computer files on a computer system running the WINDOWS operating system. This is done by the kernel or a process opening a computer file and not granting specific permissions (such as read) to other processes, thereby locking the computer file. As long as the kernel or the process holds the computer file open, other processes are subject to the permissions granted by the kernel or the process. If another process attempts to open such a locked computer file, (1) WINDOWS "sharing violation" would occur and the data in the locked computer file could not be read by that other process.

Byte-Range Locking

Another type of locking is byte-range locking. Byte-range locking gives a process the ability to lock at least one portion of at least one computer file from being read by another process. Although another process may be able to open such a byte-range locked file, if that other process attempts to read a portion of the computer file which is byte-range locked, a WINDOWS "locking violation" would occur and the data in the byte-range locked computer file could not be read by that other process.

In some circumstances, a computer file can be encrypted and locked at the same time.

Need for Accessing Locked Computer Files

The data in locked computer files can be extremely important to various computer applications that access computer files, such as computer file backup applications, virus scanning applications, and indexer applications. It is important (1) for such computer applications to be able to read and open every computer file on a computer system and (2) for computer file backup applications to maintain the encrypted status of these computer files throughout the backup of the computer system, such that even in the backup image, these computer files remain encrypted and inaccessible until they are restored to the correct user.

Prior Art Systems

Currently, prior art computer file access systems (such as a computer file backup systems) fail to address this need.

Sector-Wise Copy

In a first prior art approach, as shown in prior art FIG. 1A, a first prior art computer file access system (1) performs a sector-wise copy of data on a storage device (e.g. a hard disk) of a computer system and (2) generates an entire image of the storage device. Unfortunately, this first prior art computer file backup system produces an image of the storage device that is a monolithic copy of the storage device with individual files in the monolithic copy being unreadable without a great deal of effort. In other words, data in this format is difficult to associate with computer files and, therefore, are of little use to many computer applications, such as indexer applications. Therefore, this first prior art computer file backup system makes performing a "single file restore" from the image of the storage device very difficult to do.

Shutdown & Preboot

Figure 1B:
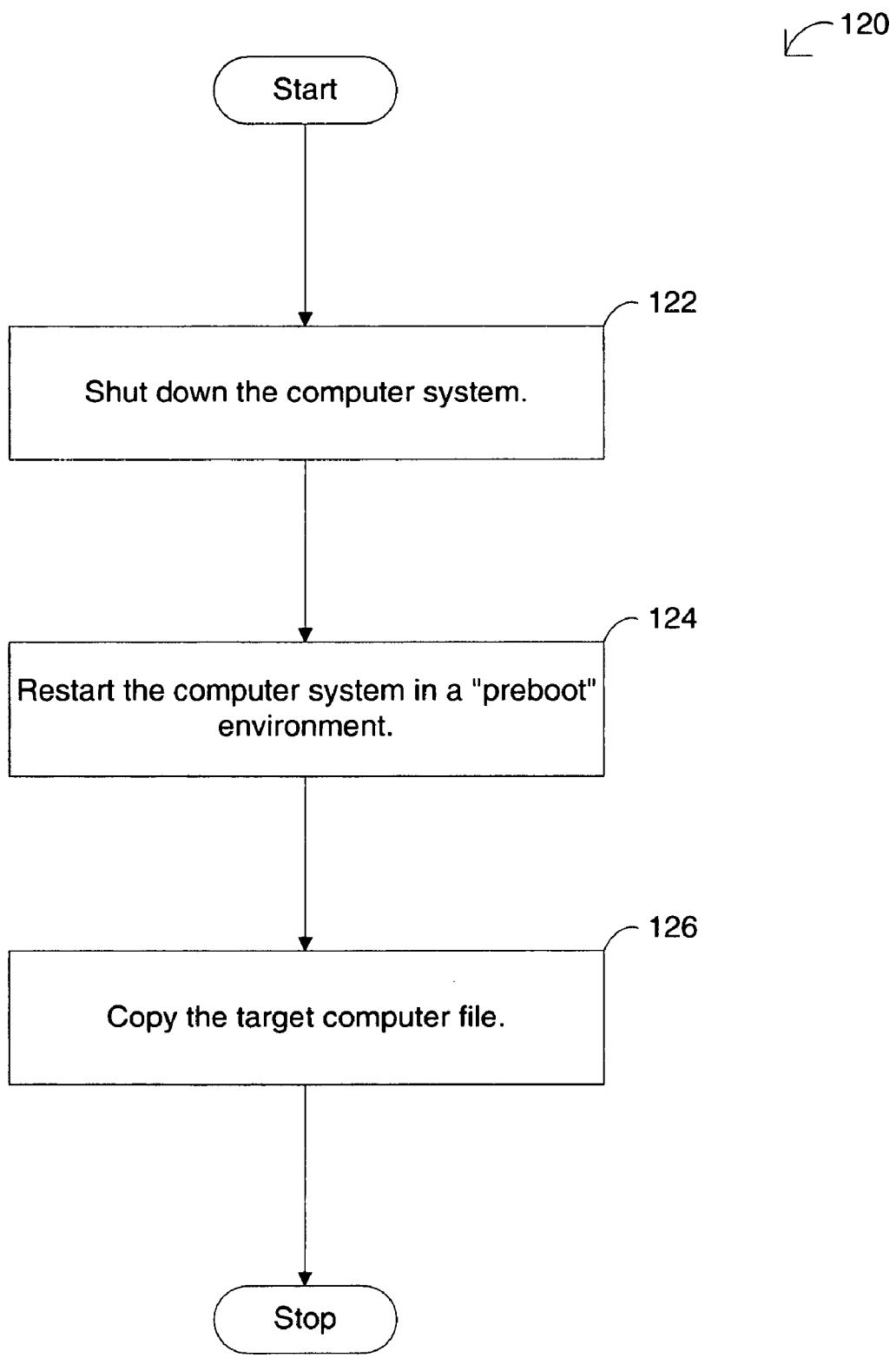

In a second prior art approach, as shown in prior art FIG. 1B, a second prior art computer file backup system (1) shuts down a computer system, (2) restarts the computer system in a "preboot" environment, and copies a computer file copy in the "preboot" environment. In the "preboot" environment, the computer file would not be locked. Thus, with this second prior art computer file backup system, the computer system is either rebooted again or finishes booting to the operating system of the computer system. This second prior art computer file backup system is poor because it requires a reboot to be able to copy computer files. Therefore, this second prior art computer file backup system cannot perform a computer file backup on a computer system while the computer system is running, such that the user of the computer system could not continue to run other computer applications on the computer system.

Combination

Figure 1C:
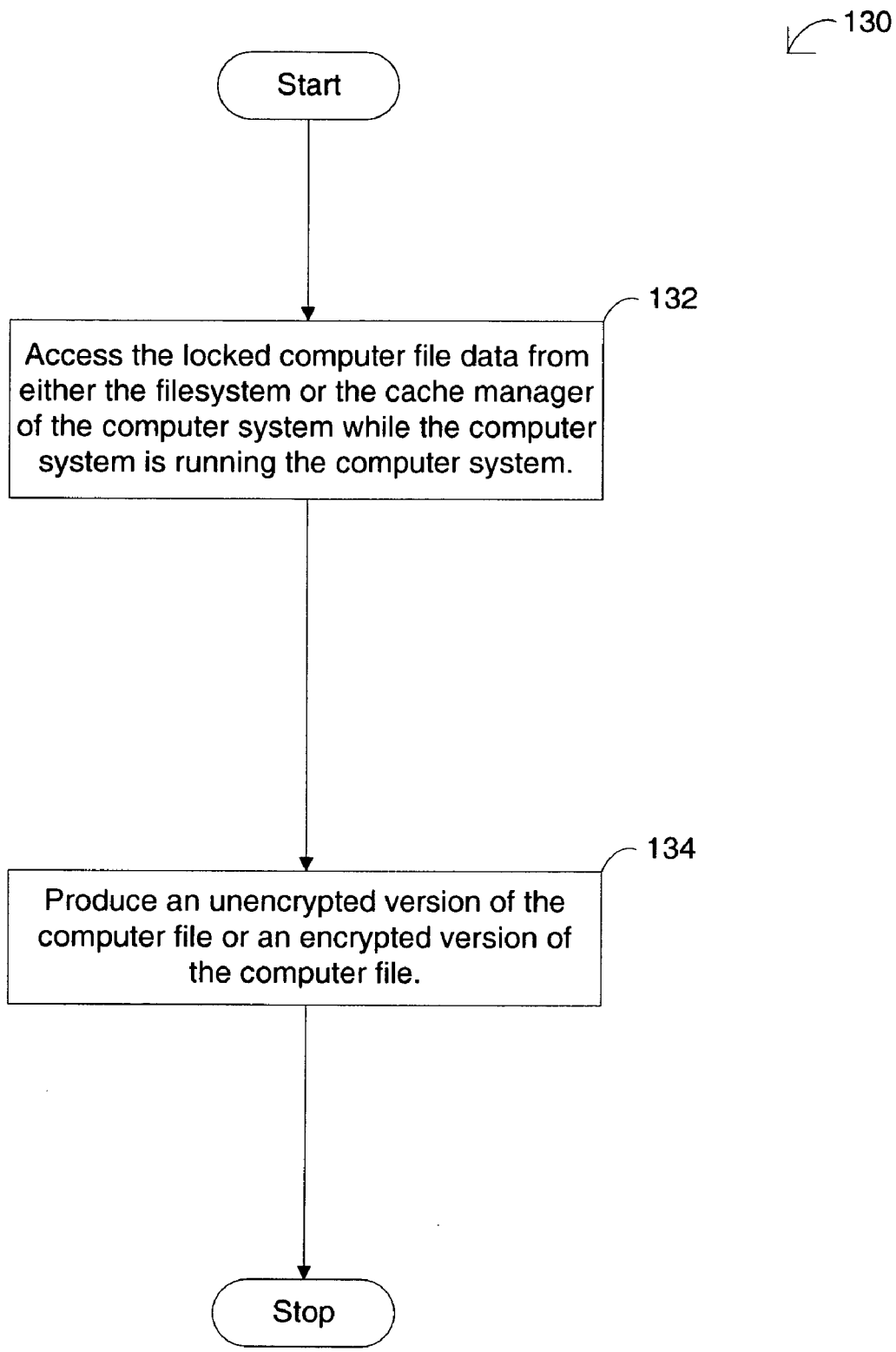

In a third prior art approach, as shown in prior art FIG. 1C, a third prior art computer file backup system uses the methods and systems described in commonly owned, pending U.S. patent application Ser. No. 10/737,581 (entitled "Method and System of Accessing at Least One Target File in a Computer System with an Operating System with File Locking Implemented at a File-Open Time", filed Dec. 15, 2003) and/or the methods and systems described in commonly owned, pending U.S. patent application Ser. No. 10/736,825 (entitled "Method and System of Accessing at Least One Target File in a Computer System with an Operating System with File Locking Implemented with Byte-Range Locking", filed Dec. 15, 2003), which allow computer applications to access locked computer file data from either the filesystem or the cache manager of a computer system while the computer system is running. Unfortunately, using this third prior art computer file backup system on a locked, encrypted computer file either (1) produces an unencrypted version of the computer file or (2) produces a useless, encrypted version of the computer file, because the third prior art computer file backup system fails to get encryption key information associated with the locked, encrypted computer file. In a computer system running the WINDOWS operating system, the encryption key information is the EFS key information associated with a locked, encrypted computer file.

Volume Shadow Copy

Figure 1D:
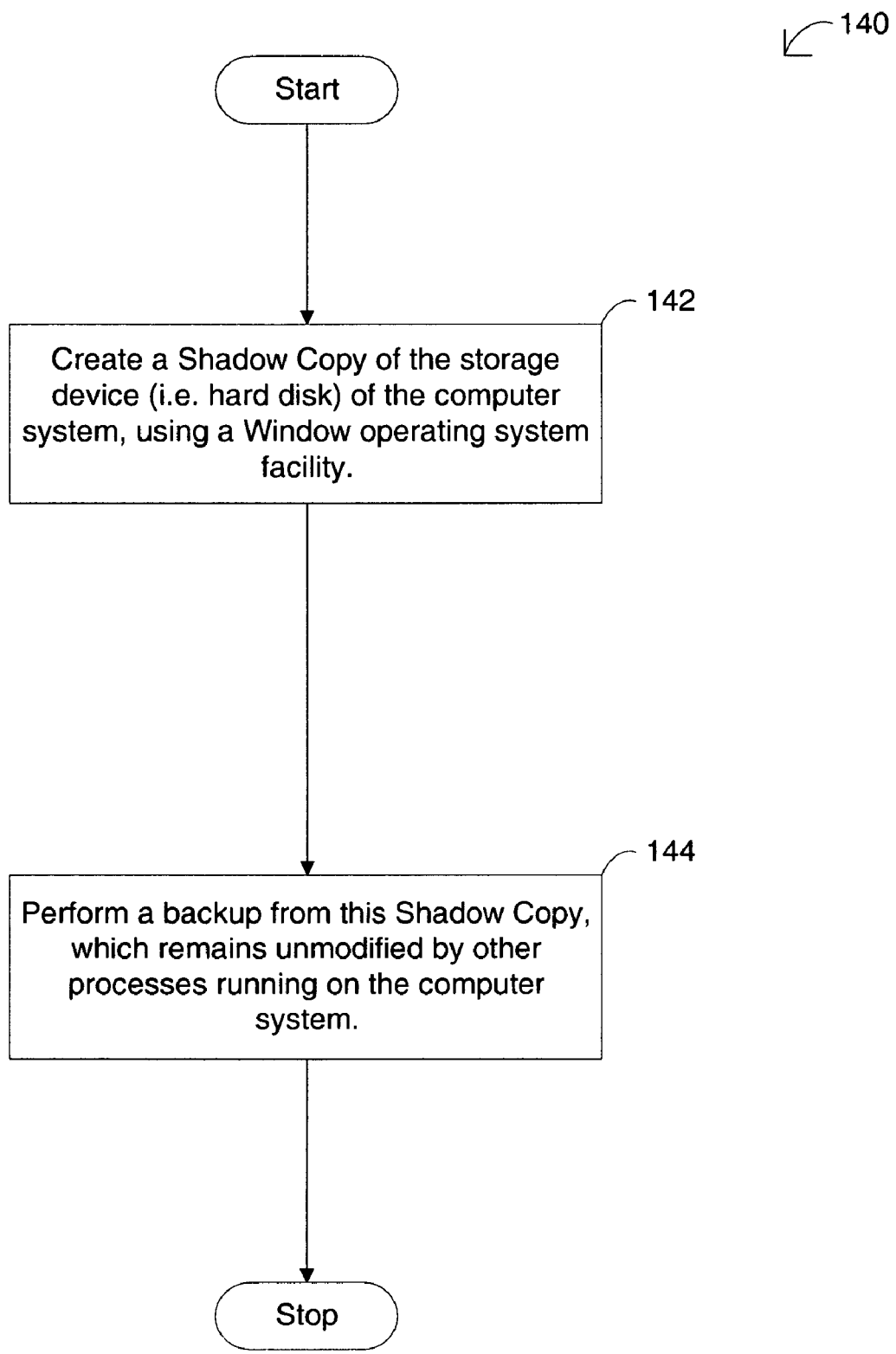

In a fourth prior art approach, as shown in prior art FIG. 1D, a fourth prior art computer file backup system, for WINDOWS XP and higher, uses a Volume Shadow Copy service to backup computer files if the Volume Shadow Copy service is enabled. In particular, the fourth prior art computer file backup system (1) creates a Shadow Copy of the storage device (i.e. hard disk) of the computer system, using a Window operating system facility and (2) performs a backup from this Shadow Copy, which remains unmodified by other processes running on the computer system. Unfortunately, this fourth prior art computer file backup system is only supported by MICROSOFT'S WINDOWS XP operating system (hereinafter "XP") and later editions of the Windows operating system. Further, this fourth prior art computer file backup system may potentially cause the computer system to run out of storage space sufficient to maintain the Shadow Copy.

Therefore, a method and system of reading at least one locked, encrypted computer file encrypted by an encryption filter driver running on an operating system of a computer system, with an added kernel driver, while the operating system is running and reading at least one locked, unencrypted computer file in a computer system with an operating system with an added kernel driver while the operating system is running is needed.

SUMMARY OF THE INVENTION

The present invention provides a method and system of reading at least one locked, encrypted computer file encrypted by an encryption filter driver running on an operating system of a computer system, with an added kernel driver, while the operating system is running. In an exemplary embodiment, the encryption filter driver is EFS. In an exemplary embodiment, the operating system is the WINDOWS operating system. In an exemplary embodiment, the method and system of reading at least one locked, encrypted computer file encrypted by an encryption filter driver running on an operating system of a computer system, with an added kernel driver, while the operating system is running include (1) getting the handle of the locked, encrypted computer file, (2) causing encryption key information associated with the locked, encrypted computer file to be processed, and (3) reading data from the locked, encrypted computer file by using the added kernel driver. In a further embodiment, the method and system include producing a temporary file having encryption filter driver information associated by the encryption filter driver with the locked, encrypted computer file by using the encryption key information. In a specific embodiment, the method and system include backing up the temporary file as a backup of the locked, encrypted computer file.

In an exemplary embodiment, the getting includes obtaining the handle by accessing the locked, encrypted computer file with file locking implemented at file-open time. In an exemplary embodiment, the getting includes obtaining the handle by accessing the locked, encrypted computer file with file locking implemented with byte-range locking. In an exemplary embodiment, the getting includes obtaining the handle by opening the locked, encrypted computer file with no access and no sharing privileges.

In an exemplary embodiment, the causing includes (1) attempting to open the locked, encrypted computer file with an access selected from the group consisting of read access, write access, and read and write access and, (2) if the attempting is successful, closing the locked, encrypted computer file. In an exemplary embodiment, the producing includes (1) duplicating the encryption filter driver information in the temporary file and (2) writing the data to the temporary file. In an exemplary embodiment, the producing includes (1) creating the temporary file with the encryption filter driver information and (2) writing the data to the temporary file.

In an exemplary embodiment, the reading includes (1) passing the handle to the kernel of the operating system, (2) reading the data from a cache manager of the computer system, and (3) passing the data to user space of the computer system. In an exemplary embodiment, the reading step includes (1) passing the handle to the kernel of the operating system, (2) creating a memory map view of the locked, encrypted computer file in the kernel, (3) reading the data by using the memory map view, and (4) passing the data to user space of the computer system.

In an exemplary embodiment, the reading includes (1) In an exemplary embodiment, the reading includes (1) passing the handle to the kernel of the operating system, (2) retrieving the data by sending an input/output request packet (IRP) to the kernel, and (3) passing the data to user space of the computer system. In an exemplary embodiment, the retrieving includes (a) getting a FILE_OBJECT corresponding to the handle and (b) requesting from the kernel a reading of the data from the computer file corresponding to the FILE_OBJECT via the input/output request packet, where the input/output request packet comprises a PAGING READ input/output request packet. In a further embodiment, the requesting includes (i) generating within the kernel a PAGING READ input/output request packet corresponding to the FILE_OBJECT at a certain offset, which is an integral of the PAGE_SIZE, and of a certain length, which is the PAGE_SIZE, and (ii) passing the PAGING READ input/output request packet to the file system driver of the operating system. In a further embodiment, the retrieving further includes (a) receiving within the kernel from the file system driver of the operating system the data from the computer file corresponding to the FILE_OBJECT and (b) obtaining the data from the computer file corresponding to the FILE_OBJECT from the added kernel driver.

The present invention also provides a method and system of reading at least one locked, unencrypted computer file in a computer system with an operating system with an added kernel driver while the operating system is running. In an exemplary embodiment, reading at least one locked, unencrypted computer file in a computer system with an operating system with an added kernel driver while the operating system is running include (1) getting the handle of the locked, unencrypted computer file and (2) reading data from the locked, unencrypted computer file by using the added kernel driver. In a further embodiment, the method and system further include backing up the data as a backup of the locked, unencrypted computer file.

In an exemplary embodiment, the getting includes obtaining the handle by accessing the locked, unencrypted computer file with file locking implemented at file-open time. In an exemplary embodiment, the getting includes obtaining the handle by accessing the locked, unencrypted computer file with file locking implemented with byte-range locking. In an exemplary embodiment, the getting includes obtaining the handle by opening the locked, unencrypted computer file with no access and no sharing privileges.

In an exemplary embodiment, the reading includes (1) passing the handle to the kernel of the operating system, (2) reading the data from a cache manager of the computer system, and (3) passing the data to user space of the computer system. In an exemplary embodiment, the reading includes (1) passing the handle to the kernel of the operating system, (2) creating a memory map view of the locked, unencrypted computer file in the kernel, (3) reading the data by using the memory map view, and (4) passing the data to user space of the computer system.

In an exemplary embodiment, the reading includes (1) passing the handle to the kernel of the operating system, (2) retrieving the data by sending an input/output request packet to the kernel, and (3) passing the data to user space of the computer system. In an exemplary embodiment, the retrieving includes (a) getting a FILE_OBJECT corresponding to the handle and (b) requesting from the kernel a reading of the data from the computer file corresponding to the FILE_OBJECT via the input/output request packet, where the input/output request packet comprises a PAGING READ input/output request packet. In a further embodiment, the requesting includes (i) generating within the kernel a PAGING READ input/output request packet corresponding to the FILE_OBJECT at a certain offset, which is an integral of the PAGE_SIZE, and of a certain length, which is the PAGE_SIZE and (ii) passing the PAGING READ input/output request packet to the file system driver of the operating system. In a further embodiment, the retrieving further includes (a) receiving within the kernel from the file system driver of the operating system the data from the computer file corresponding to the FILE_OBJECT and (b) obtaining the data from the computer file corresponding to the FILE_OBJECT from the added kernel driver.

THE FIGURES

Figure 2A:
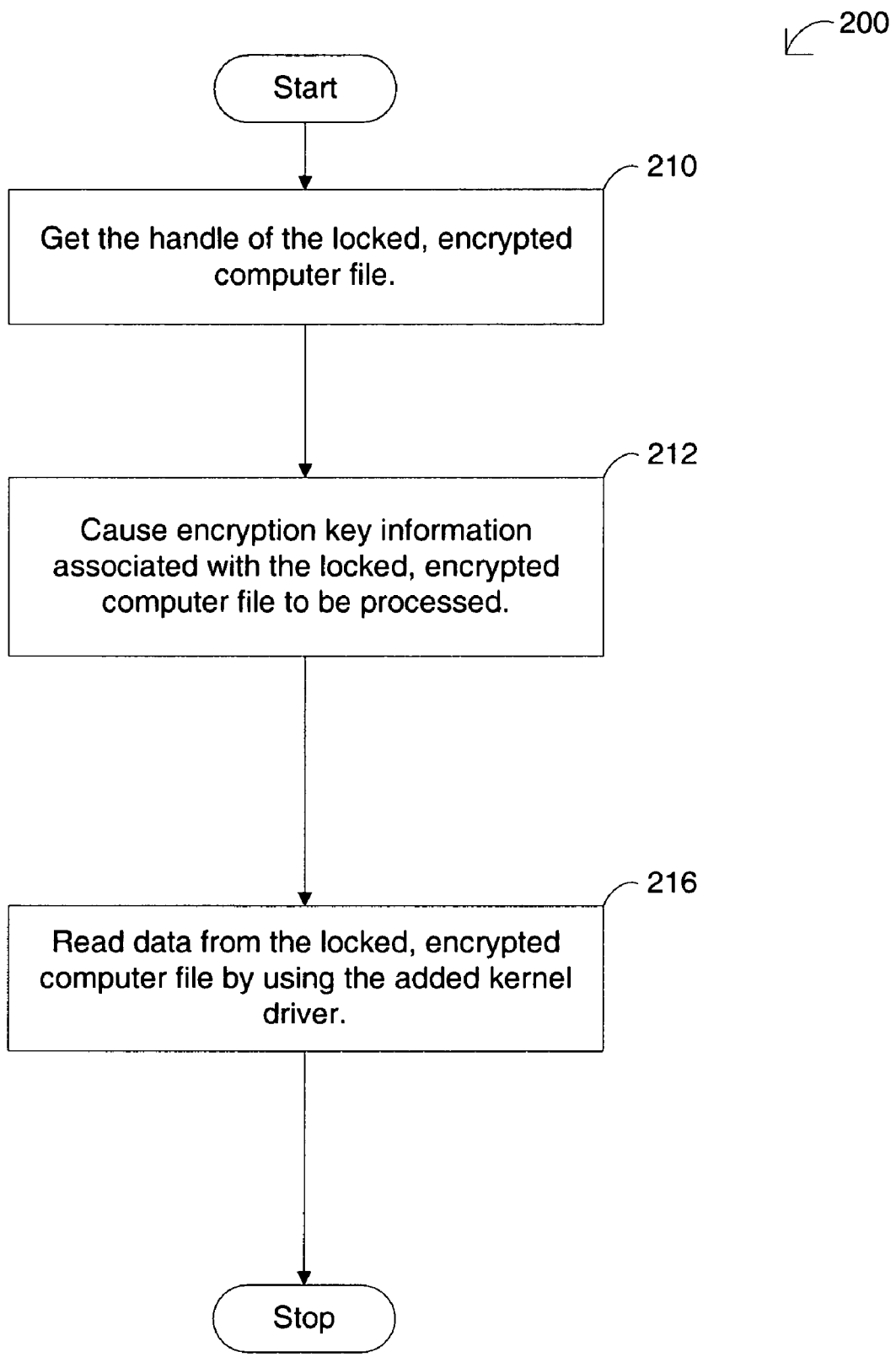
Figure 2B:
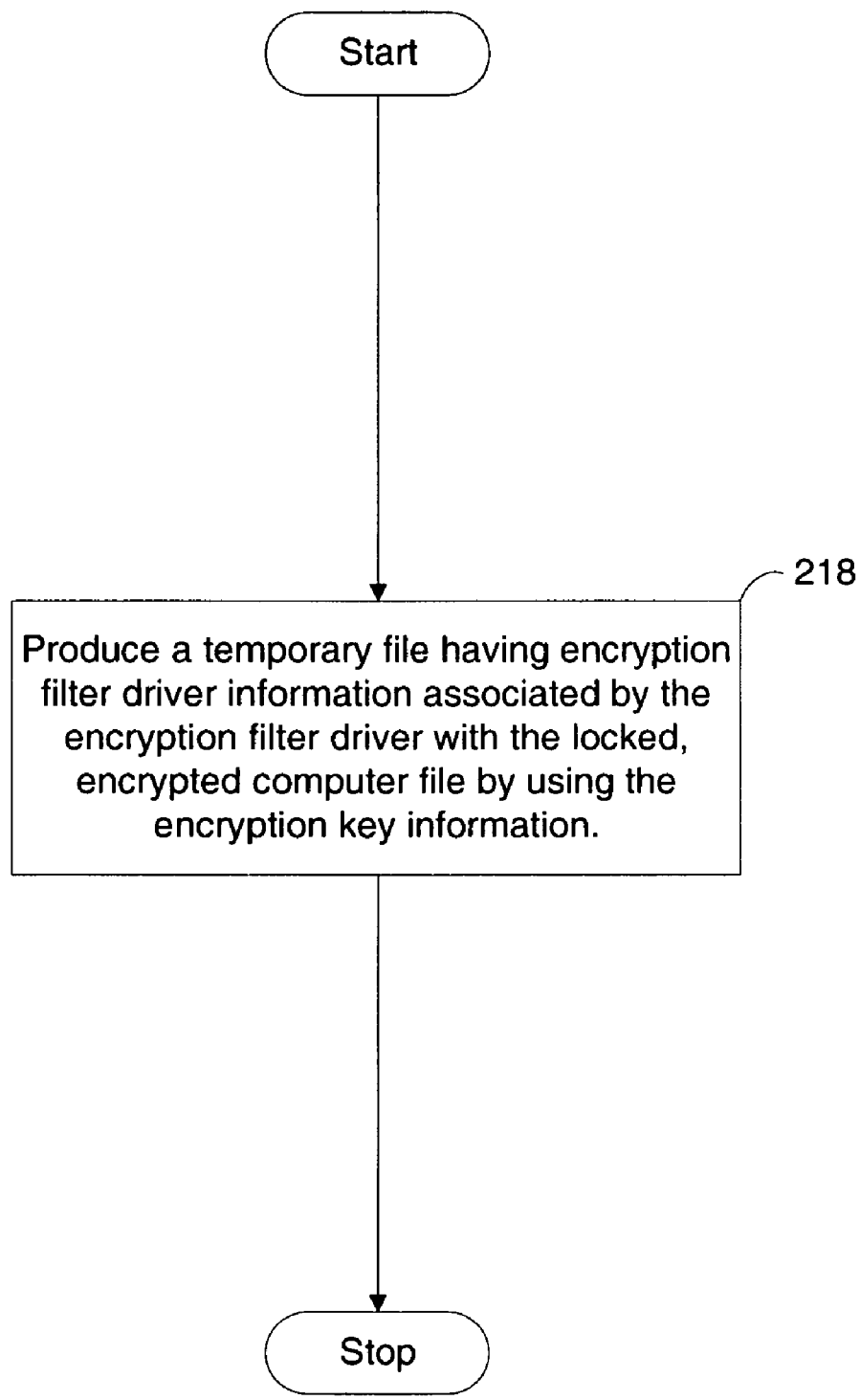
Figure 2C:
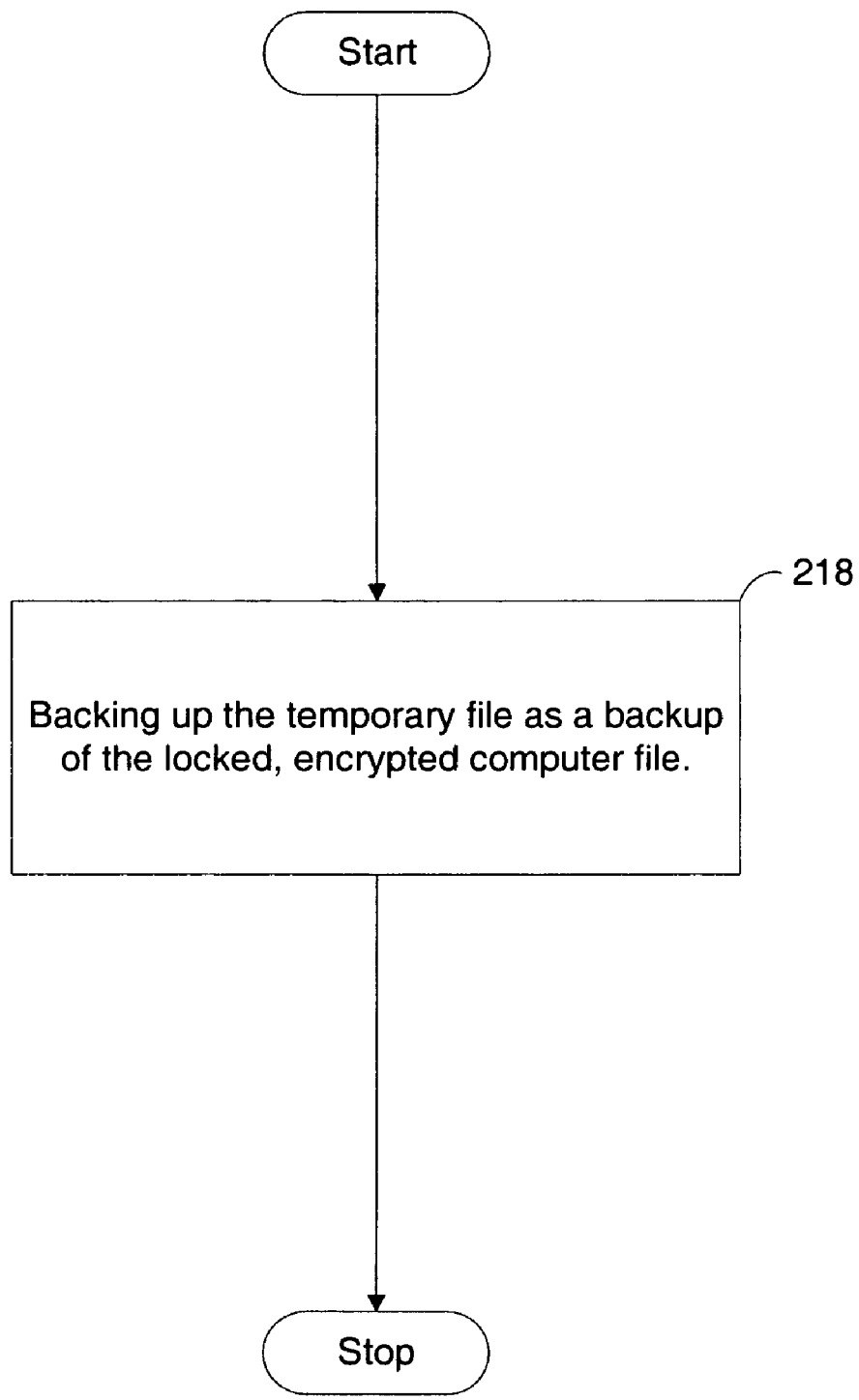
Figure 3A:
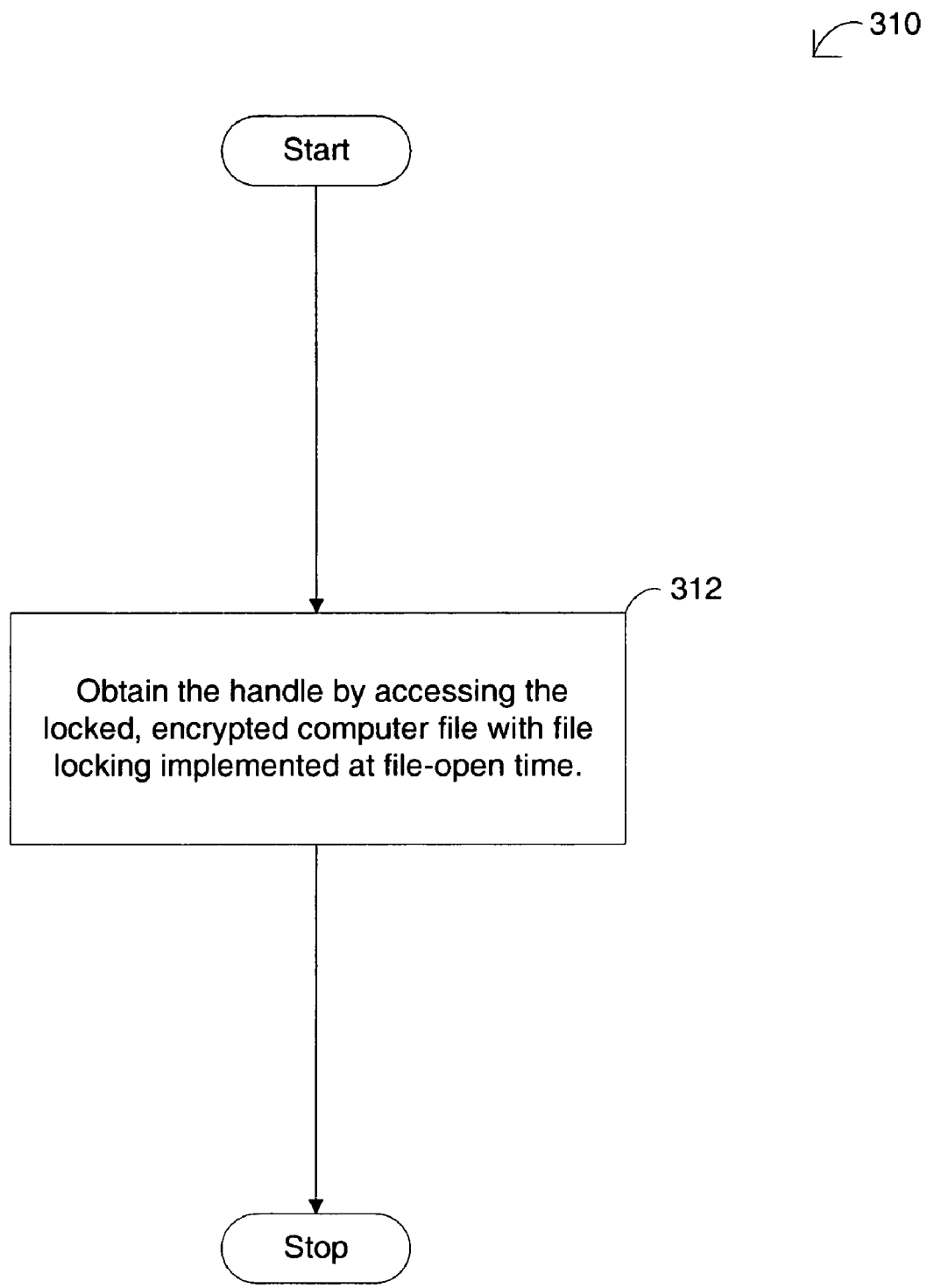
Figure 3B:
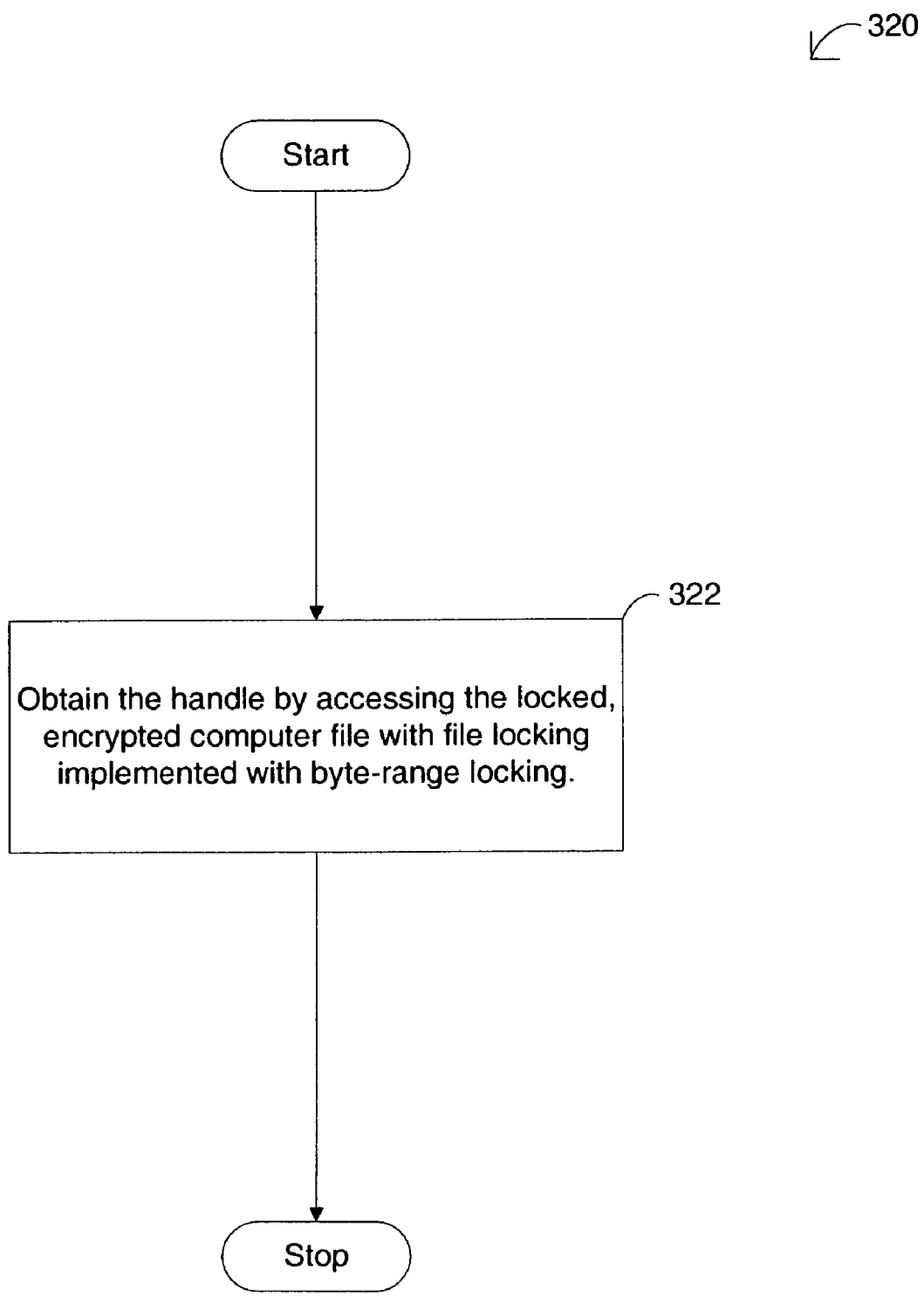
Figure 3C:
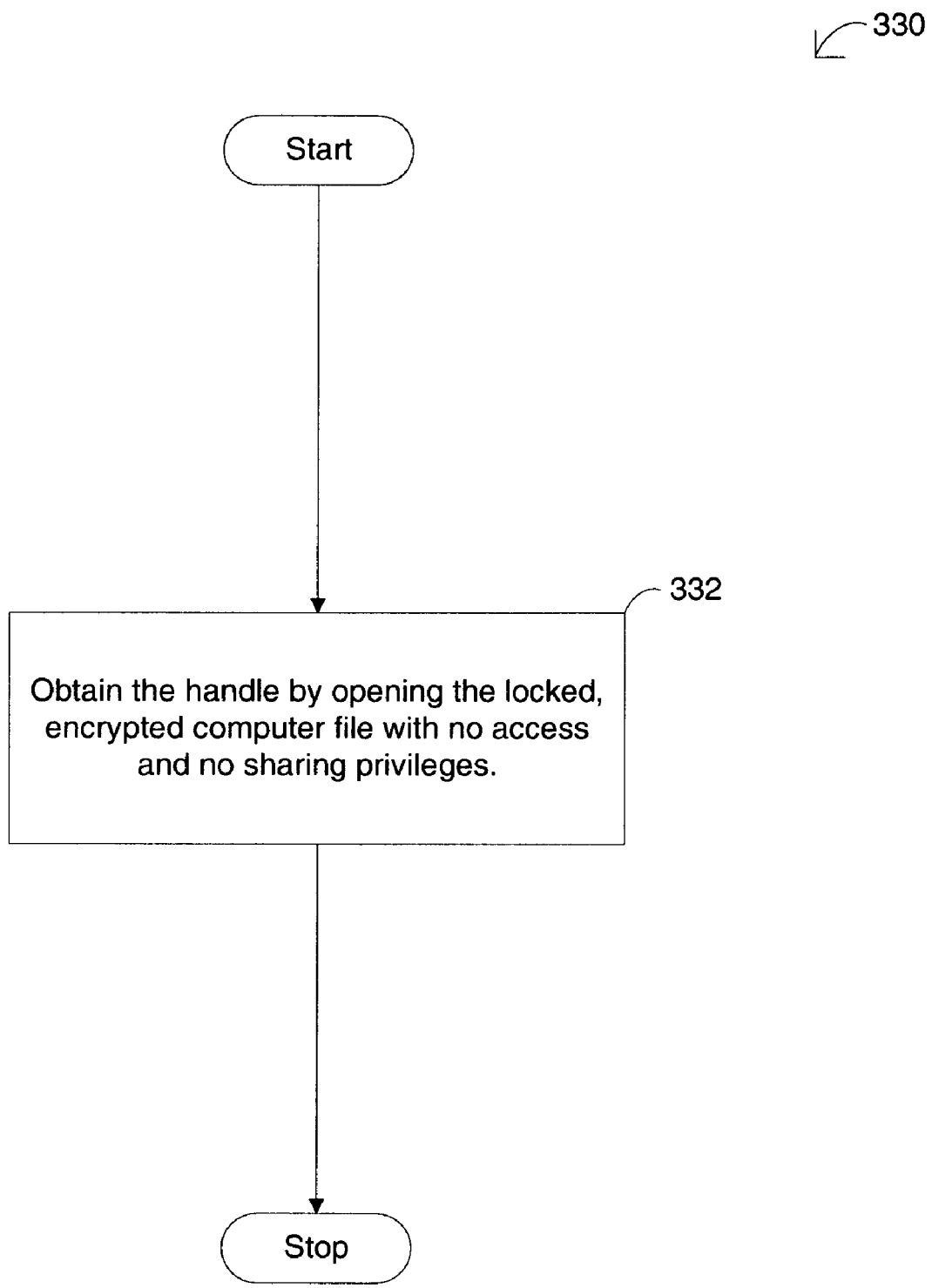
Figure 4:
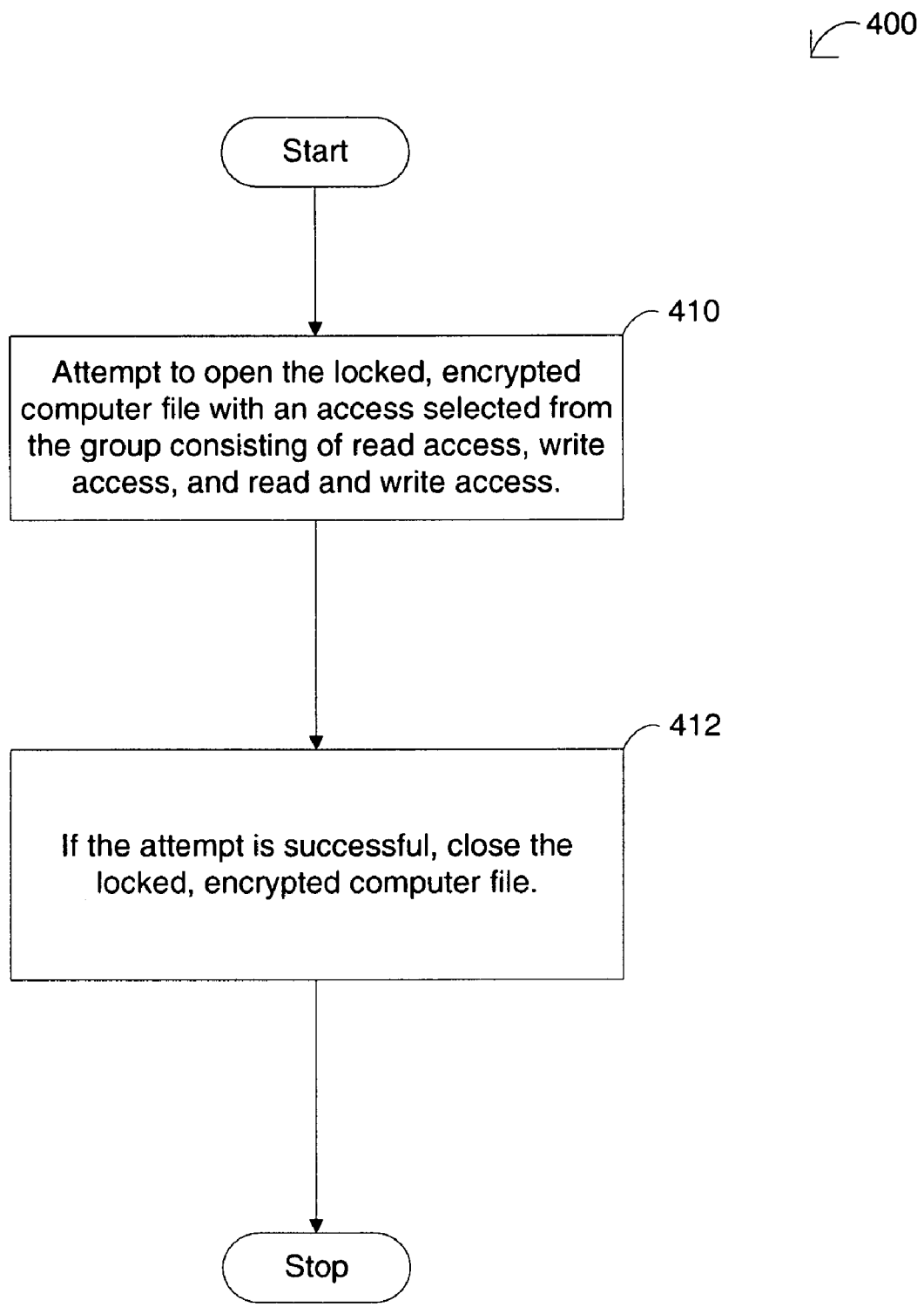
Figure 5A:
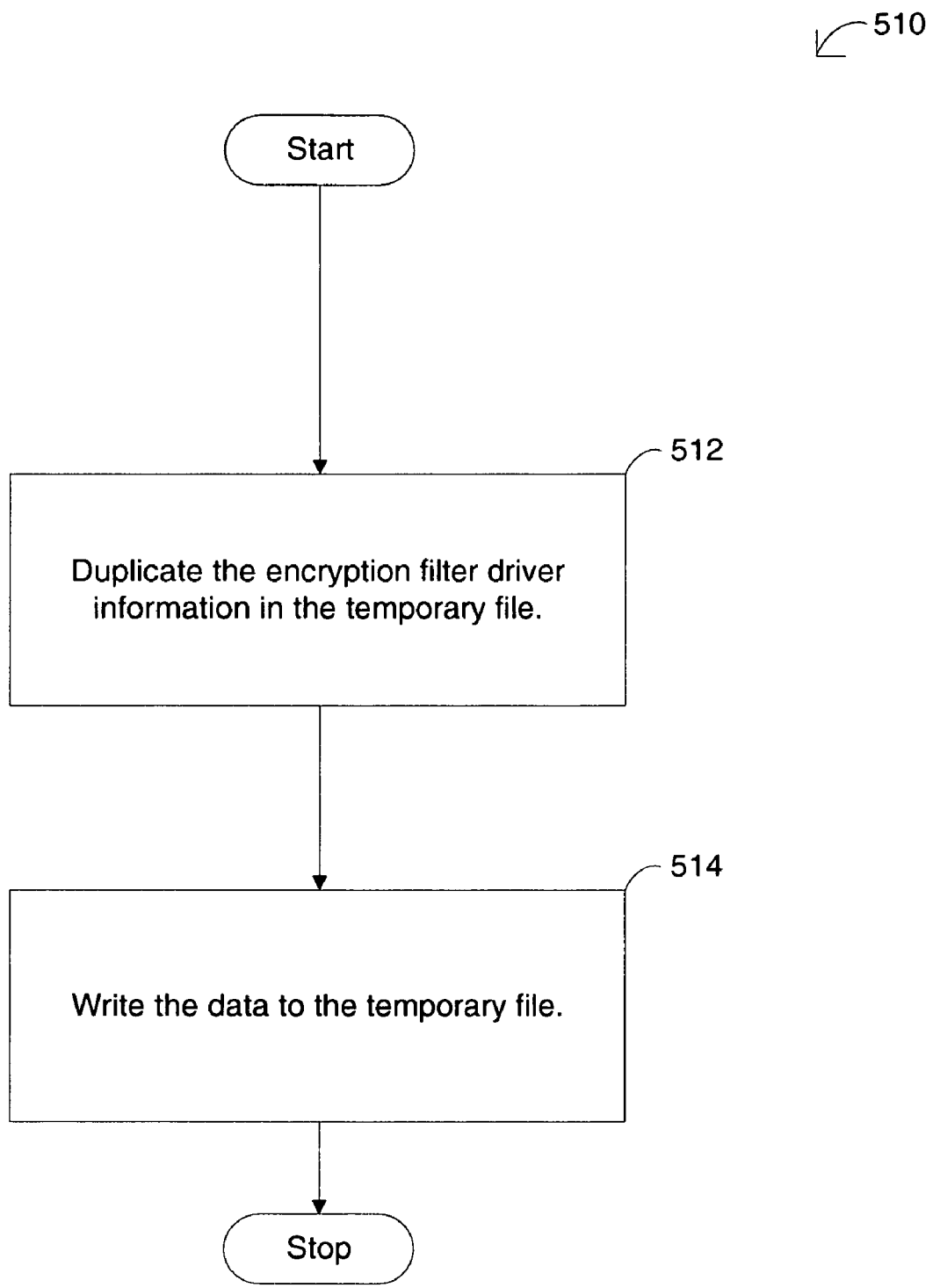
Figure 5B:
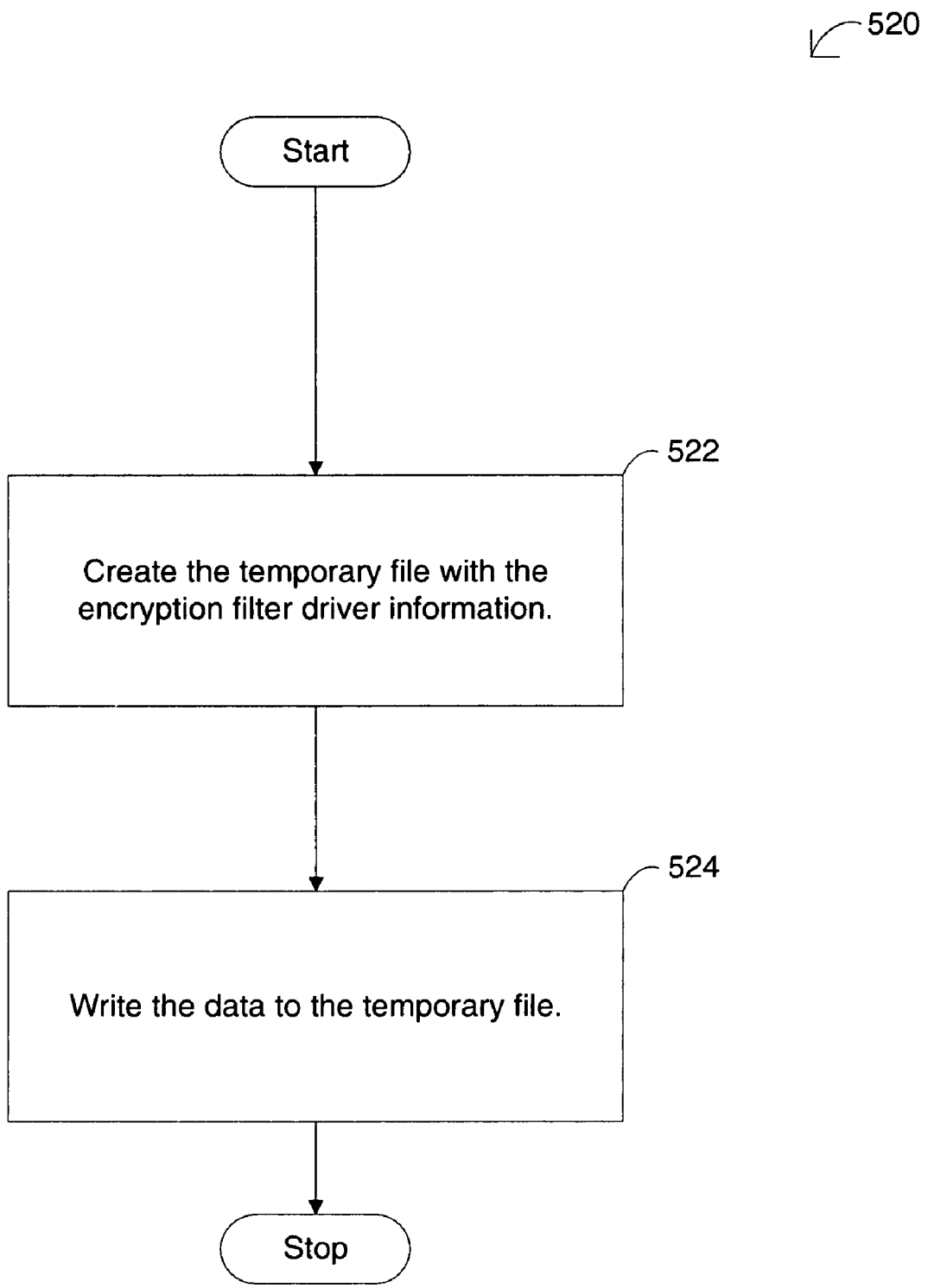
Figure 6A:
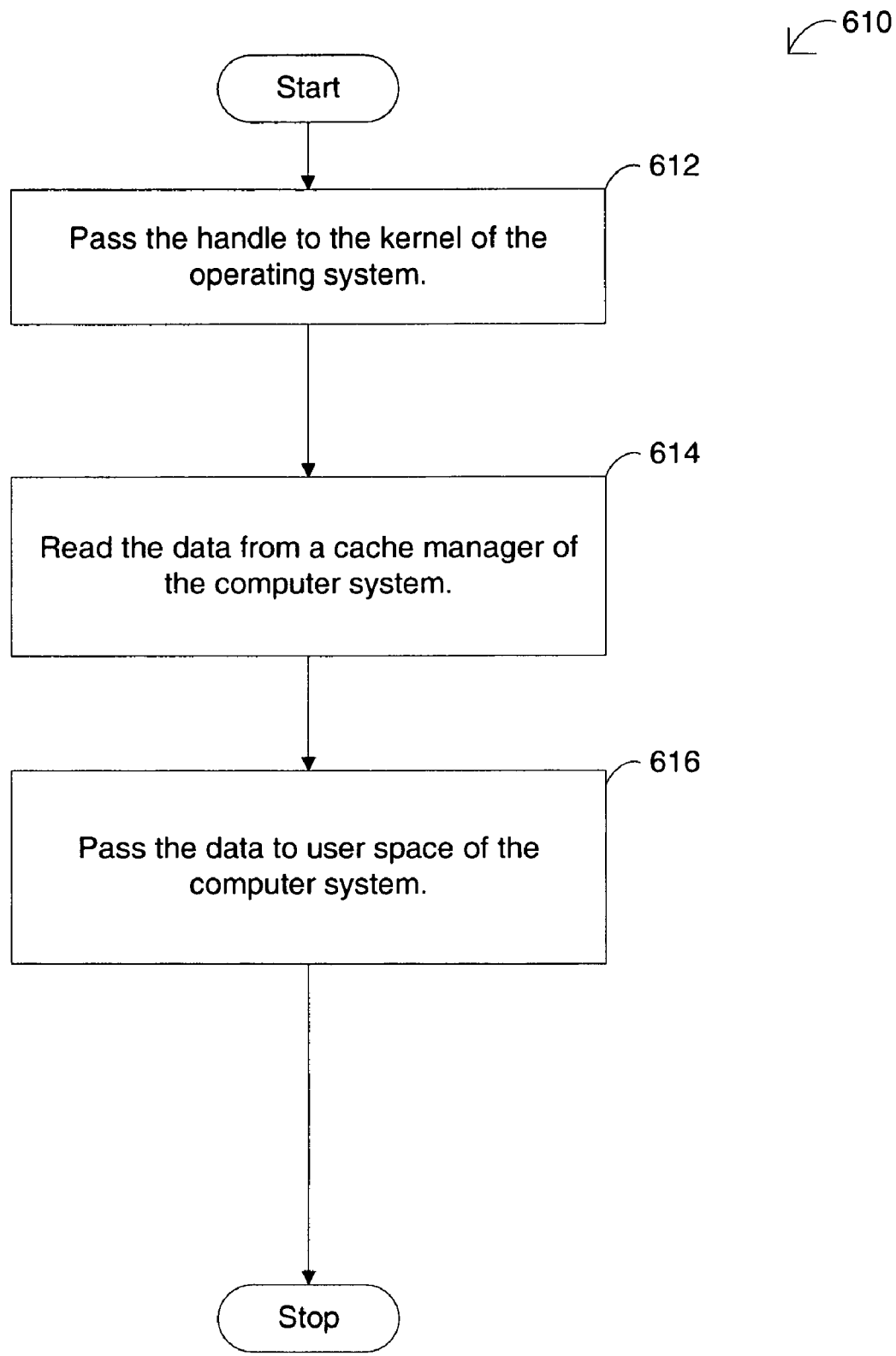
Figure 6B:
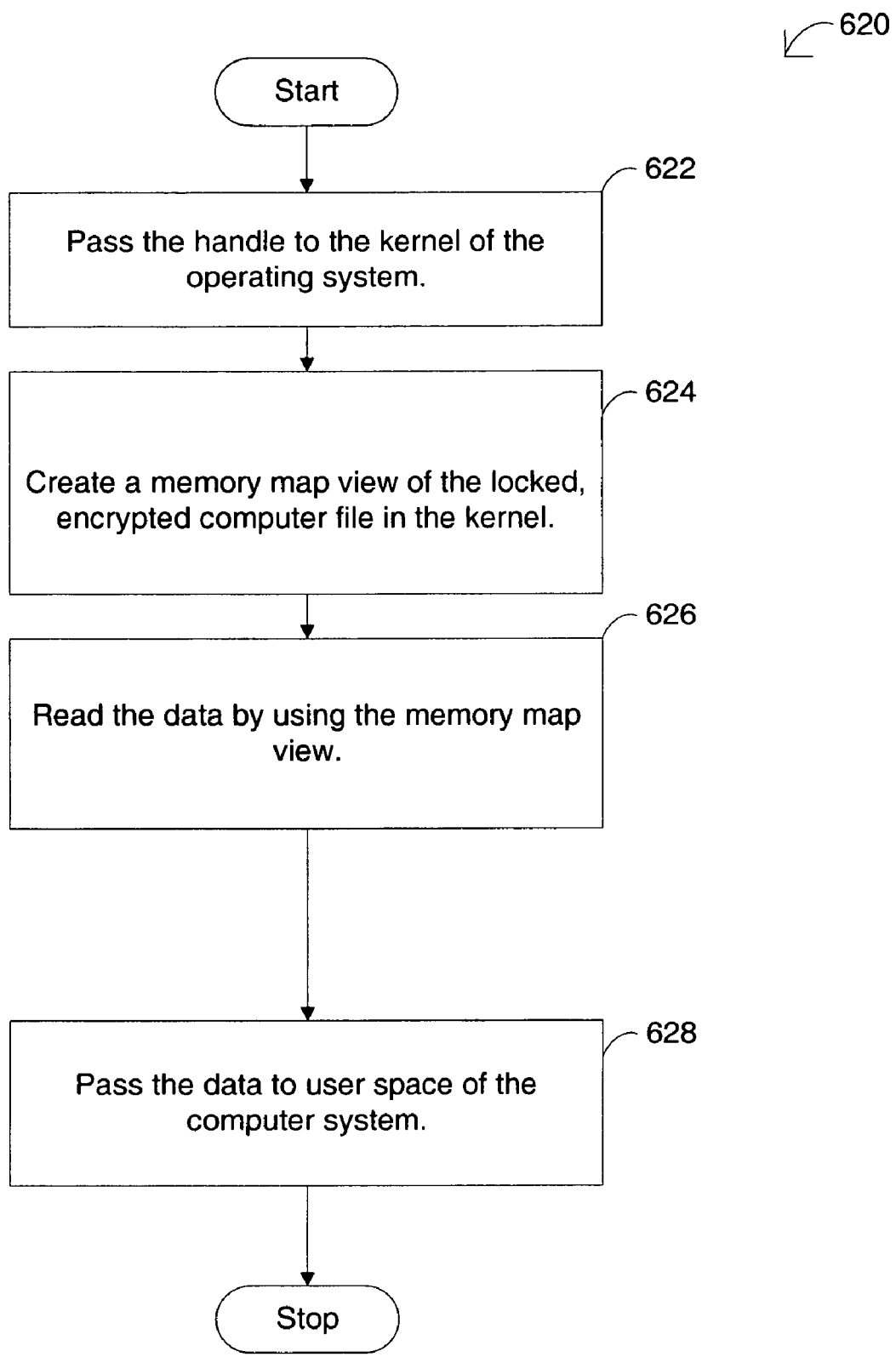
Figure 6C:
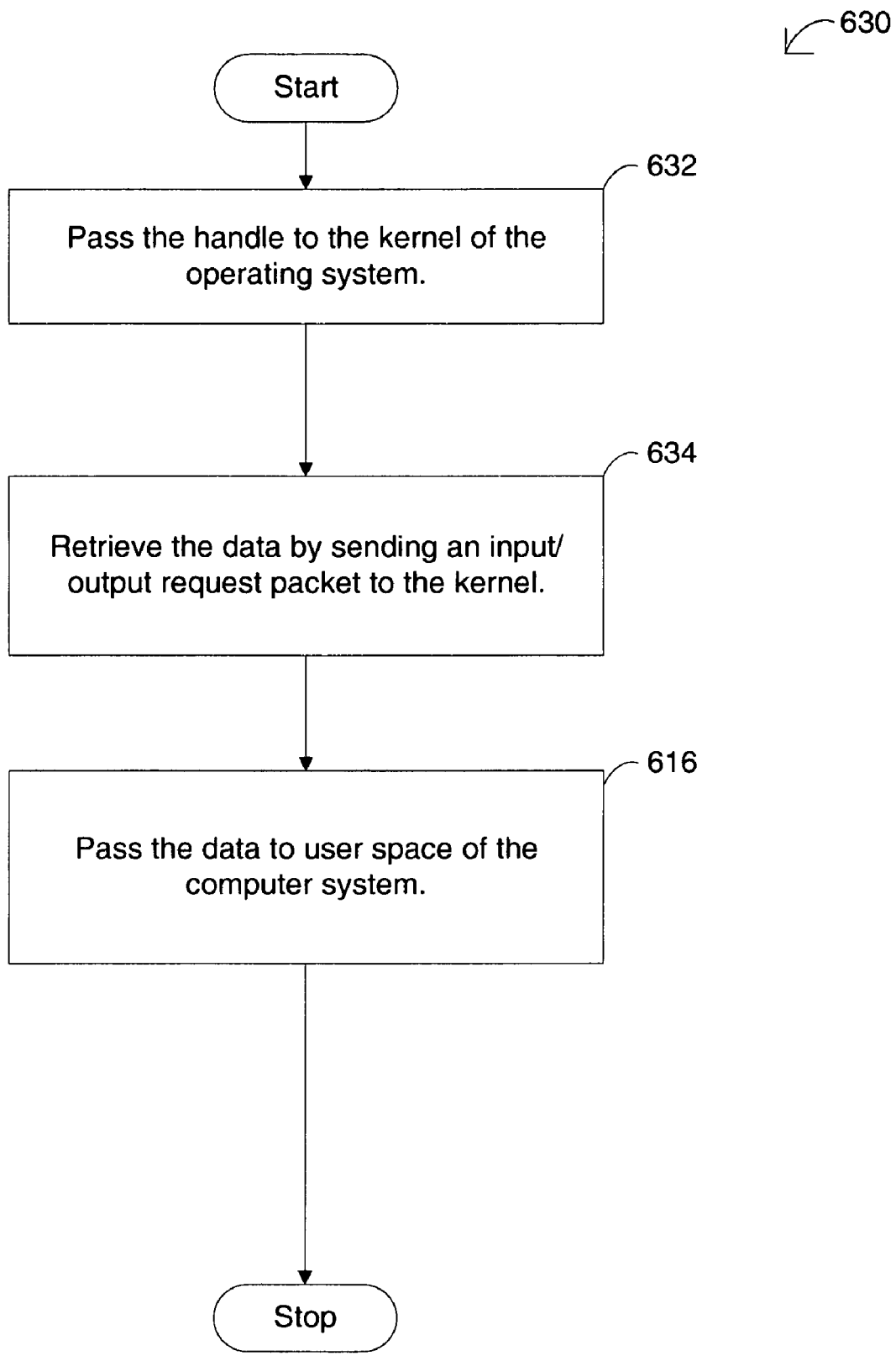
Figure 7A:
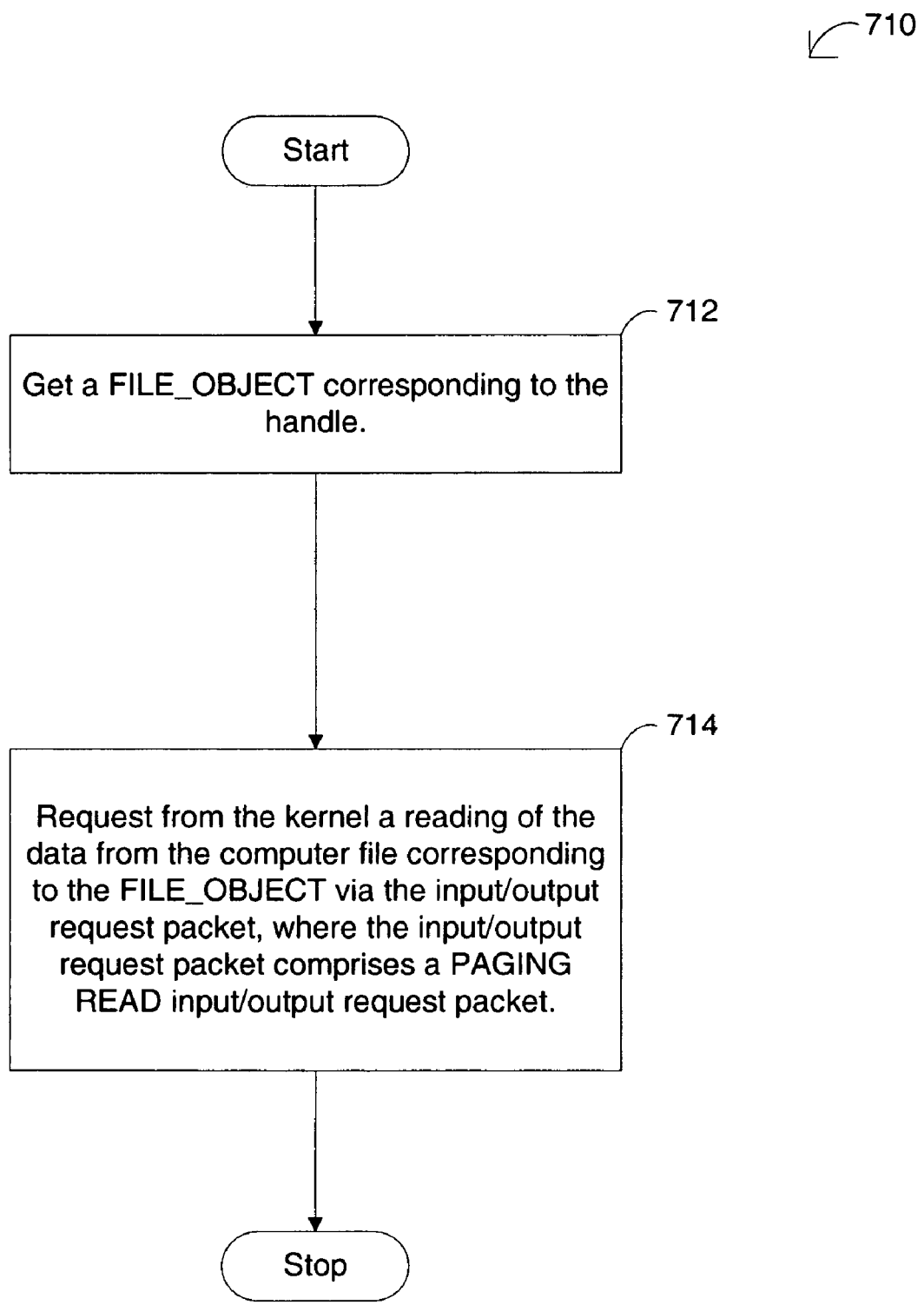
Figure 7B:
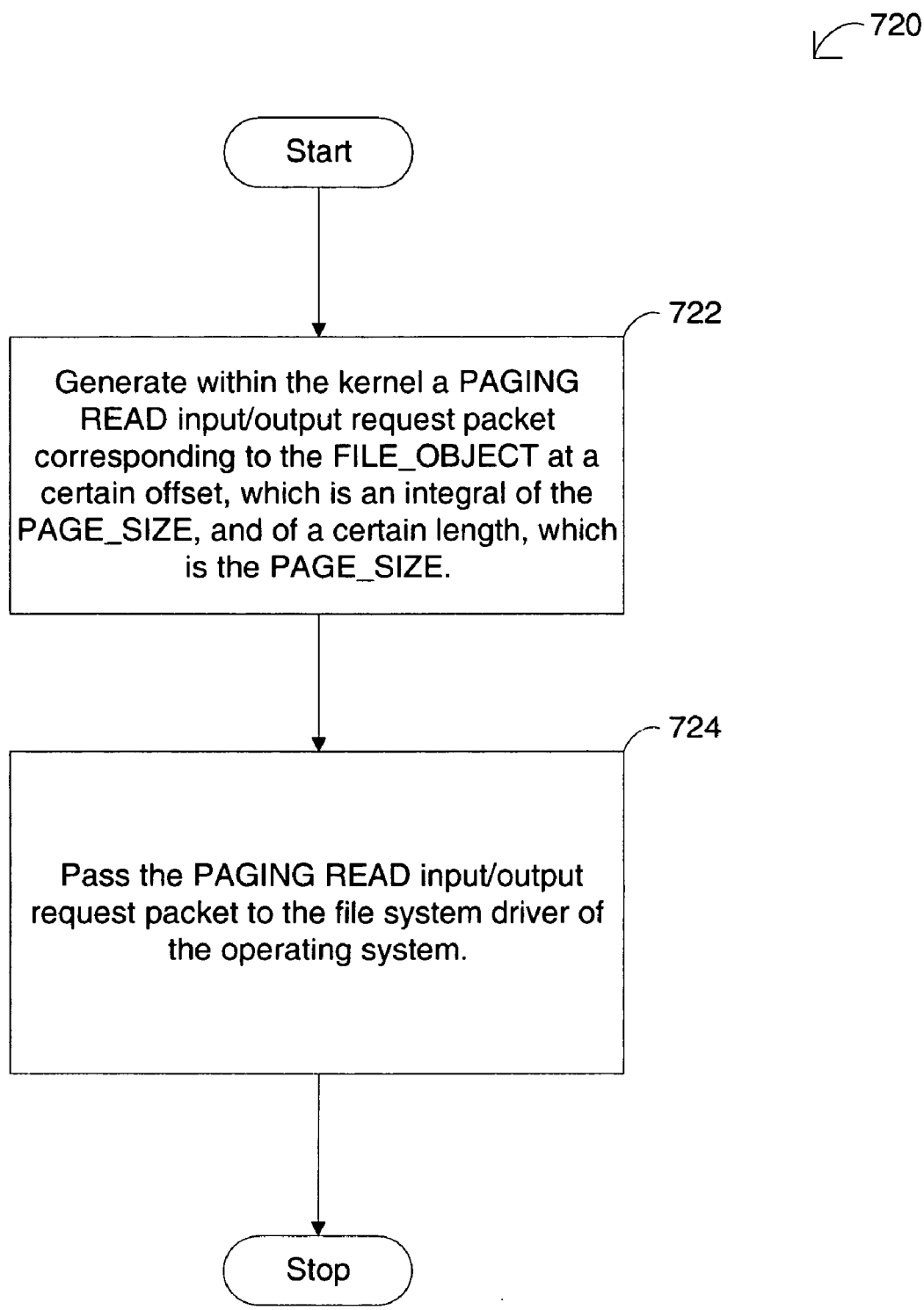
Figure 8:
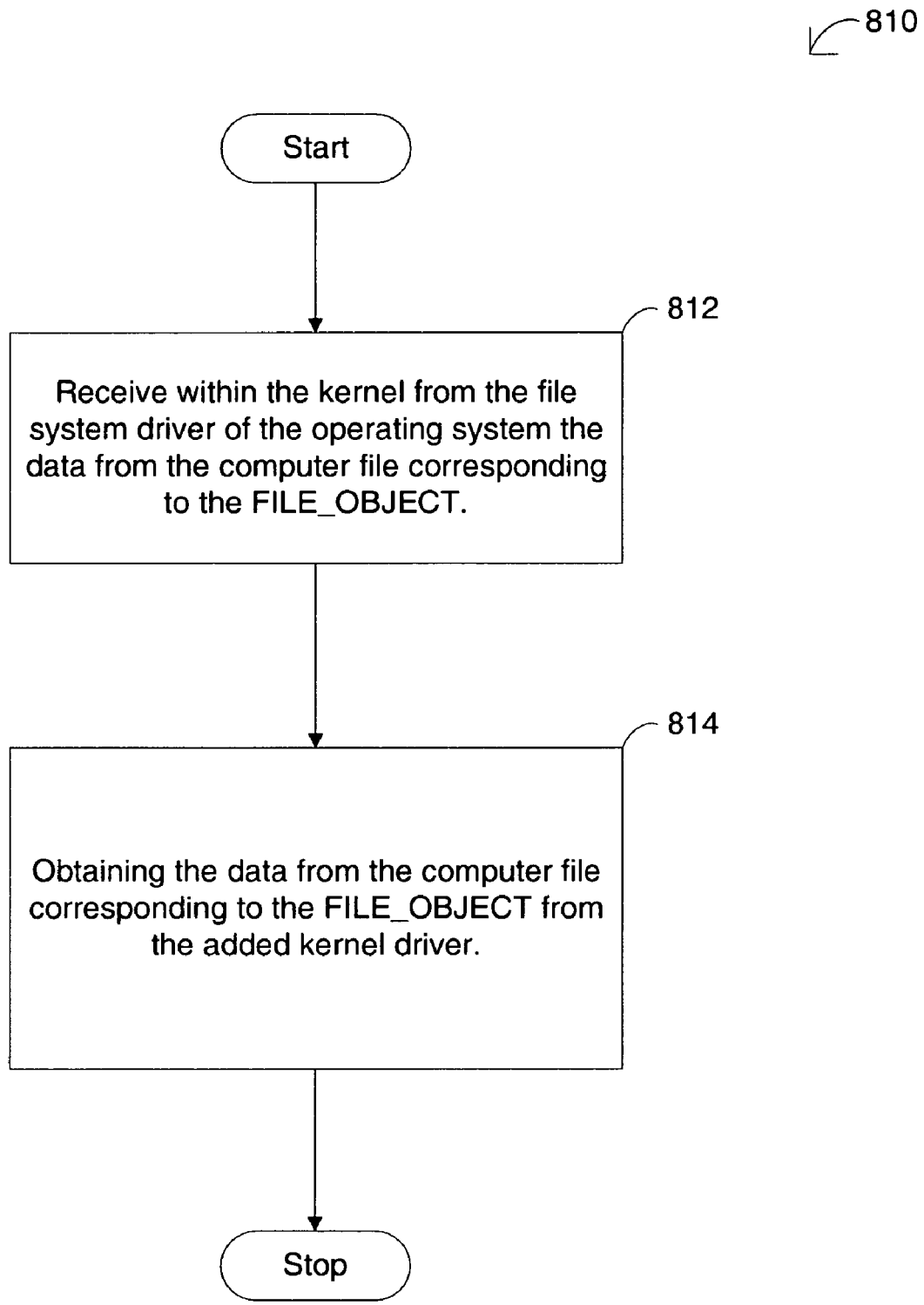

FIG. 1A is a flowchart of a prior art technique.
FIG. 1B is a flowchart of a prior art technique.
FIG. 1C is a flowchart of a prior art technique.
FIG. 1D is a flowchart of a prior art technique.
FIG. 2A is a flowchart in accordance with an exemplary embodiment of the present invention.
FIG. 2B is a flowchart in accordance with a further embodiment of the present invention.
FIG. 2C is a flowchart in accordance with a further embodiment of the present invention.
FIG. 3A is a flowchart of the getting step in accordance with an exemplary embodiment of the present invention.
FIG. 3B is a flowchart of the getting step in accordance with an exemplary embodiment of the present invention.
FIG. 3C is a flowchart of the getting step in accordance with an exemplary embodiment of the present invention.
FIG. 4 is a flowchart of the causing step in accordance with an exemplary embodiment of the present invention.
FIG. 5A is a flowchart of the producing step in accordance with an exemplary embodiment of the present invention.
FIG. 5B is a flowchart of the producing step in accordance with an exemplary embodiment of the present invention.
FIG. 6A is a flowchart of the reading step in accordance with an exemplary embodiment of the present invention.
FIG. 6B is a flowchart of the reading step in accordance with an exemplary embodiment of the present invention.
FIG. 6C is a flowchart of the reading step in accordance with an exemplary embodiment of the present invention.
FIG. 7A is a flowchart in accordance with an exemplary embodiment of the present invention.
FIG. 7B is a flowchart in accordance with a further embodiment of the present invention.
FIG. 8 is a flowchart of the reading step in accordance with a further embodiment of the present invention.

Figure 9A:
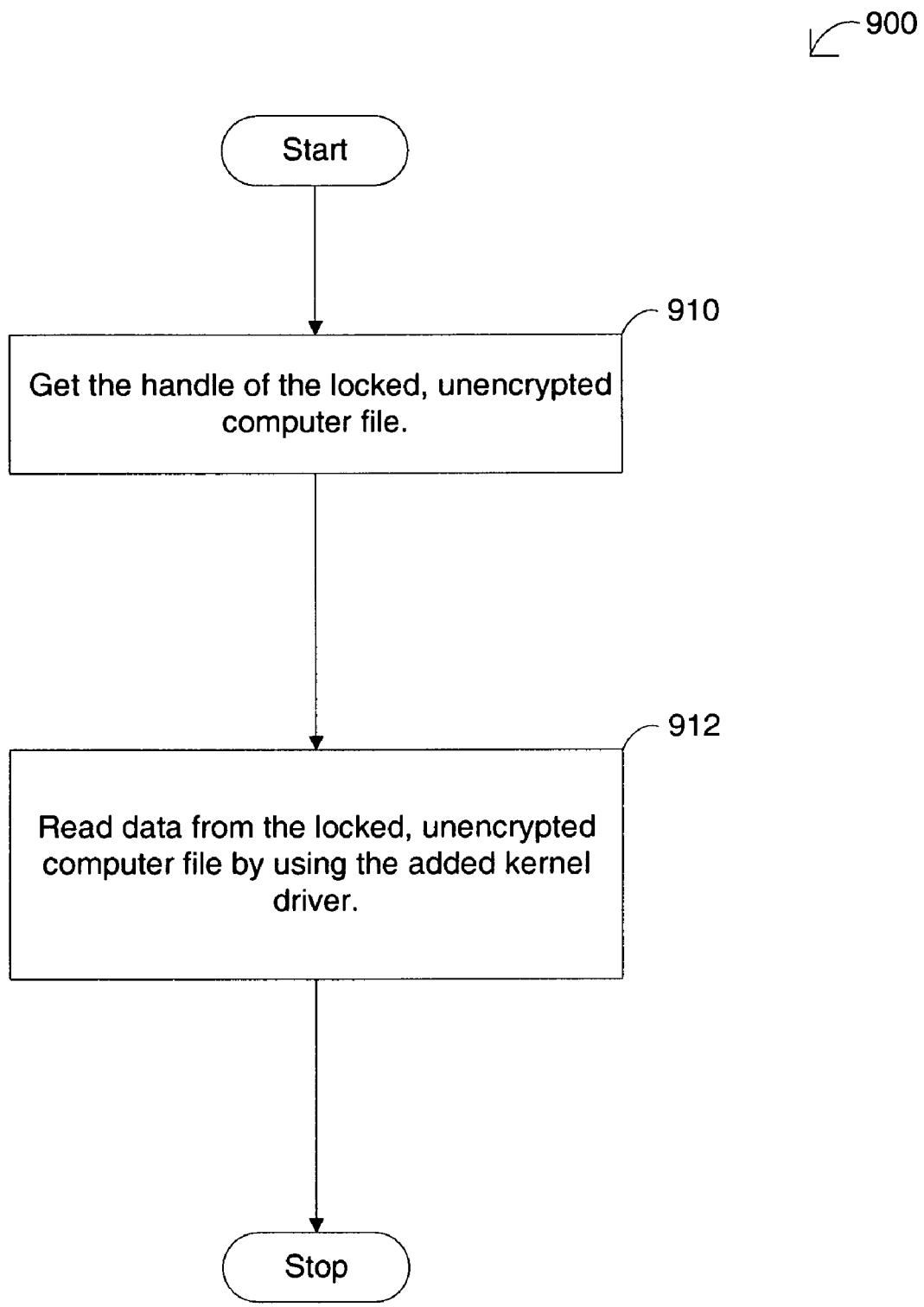
Figure 9B:
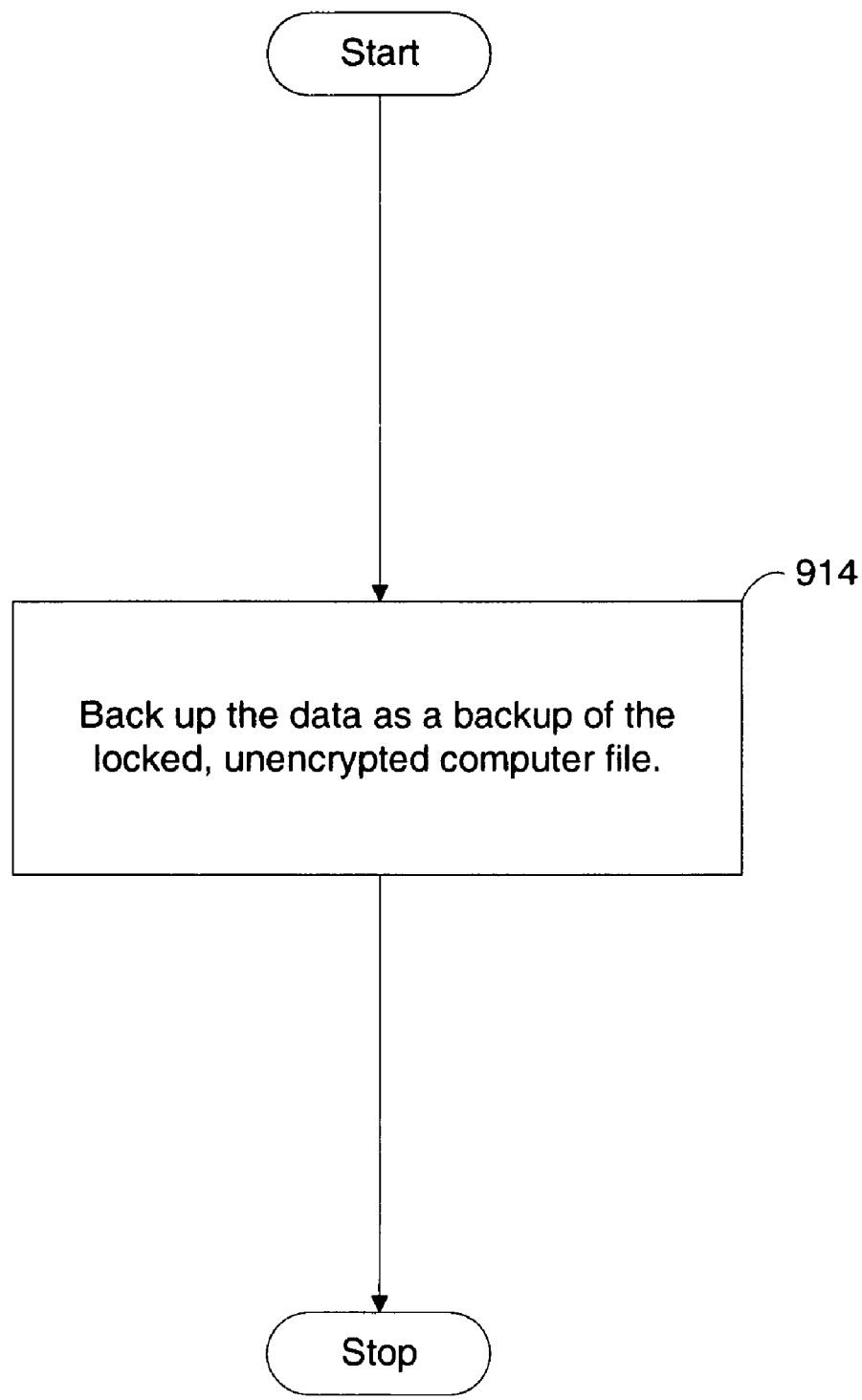

FIG. 9A is a flowchart of the producing step in accordance with an exemplary embodiment of the present invention.
FIG. 9B is a flowchart of the producing step in accordance with a further embodiment of the present invention.

DETAILED DESCRIPTION OF THE INVENTION

The present invention provides a method and system of reading at least one locked, encrypted computer file encrypted by an encryption filter driver running on an operating system of a computer system, with an added kernel driver, while the operating system is running and reading at least one locked, unencrypted computer file in a computer system with an operating system with an added kernel driver while the operating system is running.

Reading Locked, Encrypted Computer Files

The present invention provides a method and system of reading at least one locked, encrypted computer file encrypted by an encryption filter driver running on an operating system of a computer system, with an added kernel driver, while the operating system is running. In an exemplary embodiment, the encryption filter driver is EFS. In an exemplary embodiment, the operating system is the Windows operating system. In an exemplary embodiment, the method and system of reading at least one locked, encrypted computer file encrypted by an encryption filter driver running on an operating system of a computer system, with an added kernel driver, while the operating system is running include (1) getting the handle of the locked, encrypted computer file, (2) causing encryption key information associated with the locked, encrypted computer file to be processed, and (3) reading data from the locked, encrypted computer file by using the added kernel driver. In a further embodiment, the method and system include producing a temporary file having encryption filter driver information associated by the encryption filter driver with the locked, encrypted computer file by using the encryption key information. In a specific embodiment, the method and system include backing up the temporary file as a backup of the locked, encrypted computer file.

Referring to FIG. 2A, in an exemplary embodiment, the present invention includes a step 210 of getting the handle of the locked, encrypted computer file, a step 212 of causing encryption key information associated with the locked, encrypted computer file to be processed, and a step 214 of reading data from the locked, encrypted computer file by using the added kernel driver. In a further embodiment, as shown in FIG. 2B, the present invention further includes a step 216 of producing a temporary file having encryption filter driver information associated by the encryption filter driver with the locked, encrypted computer file by using the encryption key information. In a further embodiment, as shown in FIG. 2C, the present invention further includes a step 218 of backing up the temporary file as a backup of the locked, encrypted computer file.

Getting the Handle

Referring next to FIG. 3A, in an exemplary embodiment, getting step 210 includes a step 312 of obtaining the handle by accessing the locked, encrypted computer file with file locking implemented at file-open time. In an exemplary embodiment, the accessing is as described in commonly owned, pending U.S. patent application Ser. No. 10/737,581 (entitled "Method and System of Accessing at Least One Target File in a Computer System with an Operating System with File Locking Implemented at a File-Open Time", filed Dec. 15, 2003). Referring next to FIG. 3B, in an exemplary embodiment, getting step 210 includes a step 322 of obtaining the handle by accessing the locked, encrypted computer file with file locking implemented with byte-range locking. In an exemplary embodiment, the accessing is as described in commonly owned, pending U.S. patent application Ser. No. 10/736,825 (entitled "Method and System of Accessing at Least One Target File in a Computer System with an Operating System with File Locking Implemented with Byte-Range Locking", filed Dec. 15, 2003). Referring next to FIG. 3C, in an exemplary embodiment, getting step 210 includes a step 332 of obtaining the handle by opening the locked, encrypted computer file with no access and no sharing privileges. In a specific embodiment the creating includes, given the filepath of the locked, encrypted computer file, calling the CreateFile Win32 API with 0 for ShareMode and 0 for DesiredAccess.

Causing Encryption Key Information Associated with the Locked, Encrypted Computer File to be Processed Referring next to FIG. 4, in an exemplary embodiment, causing step 212 includes a step 410 of attempting to open the locked, encrypted computer file with an access selected from the group consisting of read access, write access, and read and write access and a step 412 of, if the attempting is successful, closing the locked, encrypted computer file. In an exemplary embodiment, causing step 212 includes a step attempting to open the locked, encrypted computer file with "read" access and a step of, if the attempting is successful, closing the locked, encrypted computer file. In an exemplary embodiment, causing step 212 includes a step of attempting to open the locked, encrypted computer file with "write" access and a step of, if the attempting is successful, closing the locked, encrypted computer file. In an exemplary embodiment, causing step 212 includes a step of attempting to open the locked, encrypted computer file with "read" and "write" access and a step of, if the attempting is successful, closing the locked, encrypted computer file. In a specific embodiment, if the operating system is WINDOWS, the attempting includes, given the filepath of the locked, encrypted computer file, calling the WINDOWS' CreateFile Win32 API with either "read" or "write" or "read" and "write" for DesiredAccess.

Producing a Temporary File

Referring next to FIG. 5A, in an exemplary embodiment, producing step 214 includes a step 512 of duplicating the encryption filter driver information in the temporary file and a step 514 of writing the data to the temporary file. In a specific embodiment, the duplicating includes, if the operating system is WINDOWS XP, using the command DuplicateEncryptionInfoFile. In a specific embodiment, the duplicating includes, if the operating system is MICROSOFT'S WINDOWS 2000 operating system (hereinafter "Win2000"), (a) using the command GetProcAddress against advapi32.dll and calling DuplicateEncryptionInfoFile with only the first two parameters of the XP version of the DuplicateEncryptionInfoFile command. Referring next to FIG. 5B, in an exemplary embodiment, producing step 214 includes a step 522 of creating the temporary file with the encryption filter driver information and a step 524 of writing the data to the temporary file.

Reading Data

Referring next to FIG. 6A, in an exemplary embodiment, reading step 216 includes a step 612 of passing the handle to the kernel of the operating system, a step 614 of reading the data from a cache manager of the computer system, and a step 616 of passing the data to user space of the computer system. Referring next to FIG. 6B, in an exemplary embodiment, reading step 216 includes a step 622 of passing the handle to the kernel of the operating system, a step 624 of creating a memory map view of the locked, encrypted computer file in the kernel, a step 626 of reading the data by using the memory map view, and a step 628 of passing the data to user space of the computer system. Referring next to FIG. 6C, in an exemplary embodiment, reading step 216 includes a step 632 of passing the handle to the kernel of the operating system, a step 634 of retrieving the data by sending an input/output request packet (IRP) to the kernel, and a step 636 of passing the data to user space of the computer system.

Sending an Input/Output Request Packet

It should be possible to read directly using the handle in user space. However, this handle is still constrained by the permissions that the original protecting process had placed upon it, and an attempted read on this handle would generate an access violation.

Therefore, the user level program passes this handle into the kernel program and asks it to read data from the file described by this handle at a certain offset, which must be an integral value of the PAGE_SIZE (usually 4096 bytes), and of a certain length, which must also be the PAGE_SIZE. Simply issuing a ZwReadFile from the kernel also fails with an access violation for the reasons described above.

Data from this file is extracted through generating a PAGING READ Input/Output Request Packet (IRP) in the kernel and passing it down to the underlying filesystem (NTFS, FAT32, etc) where the data for the computer file resides.

Referring to FIG. 7A, in an exemplary embodiment, retrieving step 634 includes a step 712 of getting a FILE_OBJECT corresponding to the handle and a step 714 of requesting from the kernel a reading of the data from the computer file corresponding to the FILE_OBJECT via the input/output request packet, where the input/output request packet comprises a PAGING READ input/output request packet. In a further embodiment, as shown in FIG. 7B, requesting 714 step includes a step 722 of generating within the kernel a PAGING READ input/output request packet corresponding to the FILE_OBJECT at a certain offset, which is an integral of the PAGE_SIZE, and of a certain length, which is the PAGE_SIZE, and a step 724 of passing the PAGING READ input/output request packet to the file system driver of the operating system.

Receiving Data Corresponding to the Target File

The filesystem of the computer system responds with the requested data, and the kernel program passes that data back up to user space. Thus, a read has been performed on the locked computer file. Repeating these reads at different offsets until the end of the file is reached will yield a perfect copy of the data for this file on disk.

Referring next to FIG. 8, in a further embodiment, retrieving step 634 further includes a step 812 of receiving within the kernel from the file system driver of the operating system the data from the computer file corresponding to the FILE_OBJECT and a step 814 of obtaining the data from the computer file corresponding to the FILE_OBJECT from the added kernel driver.

Reading Locked, Unencrypted Computer Files

The present invention also provides a method and system of reading at least one locked, unencrypted computer file in a computer system with an operating system with an added kernel driver while the operating system is running. In an exemplary embodiment, the operating system is the WINDOWS operating system. In an exemplary embodiment, the method and system of reading at least one locked, unencrypted computer file in a computer system with an operating system with an added kernel driver while the operating system is running include (1) getting the handle of the locked, unencrypted computer file and (2) reading data from the locked, unencrypted computer file by using the added kernel driver. In a further embodiment, the method and system further include backing up the data as a backup of the locked, unencrypted computer file.

Referring to FIG. 9A, in an exemplary embodiment, the present invention includes a step 910 of getting the handle of the locked, unencrypted computer file and a step 912 of reading data from the locked, unencrypted computer file by using the added kernel. In a further embodiment, as shown in FIG. 9B, the present invention further includes a step 914 of backing up the data as a backup of the locked, unencrypted computer file.

CONCLUSION

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A method for reading a locked encrypted computer file, comprising:
    obtaining a handle of a locked encrypted computer file that is running on a computer system's operating system, said operating system having filesystem-level encryption;
    processing encryption key information associated with said computer file wherein said processing comprises:
        attempting to open said computer file with an access selected from the group consisting of: read access, write access, and read and write access, and
        if said attempting to open said file is successful, closing said computer file after said encryption key information is processed; and
    reading data from said computer file, wherein said reading comprises:
        passing the handle to a kernel of said operating system,
        retrieving the data by sending an input/output request packet to the kernel, wherein said retrieving comprises:
            getting a FILE_OBJECT corresponding to the handle,
            requesting, from the kernel, a reading of the data from said computer file, said computer file corresponding to the FILE_OBJECT via the input/output request packet, wherein the input/output request packet comprises a PAGING READ input/output request packet, and
            receiving, within the kernel, from a driver of said operating system, the data from said computer file corresponding to the FILE_OBJECT, and
        passing the data to user space of said operating system.

2. The method of claim 1, wherein the handle is obtained by opening said computer file.

3. The method of claim 2, wherein said computer file is opened by specifying no access and no sharing privileges.

4. The method of claim 1, wherein said requesting comprises:
    generating within the kernel a PAGING READ input/output request packet corresponding to the FILE_OBJECT at a certain offset, which is an integral of the PAGE_SIZE, and of a certain length, which is the PAGE_SIZE; and
    passing the PAGING READ input/output request packet to said driver.

5. A computer program product for reading a locked encrypted computer file, the computer program product comprising a computer readable non-transitory storage medium having computer readable program code embodied therewith, the computer readable program code comprising:
    computer readable program code for obtaining a handle of a locked encrypted computer file that is running on a computer system's operating system, said operating system having filesystem-level encryption;
    computer readable program code for processing encryption key information associated with said computer file wherein said processing comprises:
        attempting to open said computer file with an access selected from the group consisting of: read access, write access, and read and write access, and
        if said attempting to open said file is successful, closing said computer file after said encryption key information is processed; and
    computer readable program code for reading data from said computer file, wherein said reading comprises:
        passing the handle to a kernel of said operating system,
        retrieving the data by sending an input/output request packet to the kernel, wherein said retrieving comprises:
            getting a FILE_OBJECT corresponding to the handle,
            requesting, from the kernel, a reading of the data from said computer file, said computer file corresponding to the FILE_OBJECT via the input/output request packet, wherein the input/output request packet comprises a PAGING READ input/output request packet, and
            receiving, within the kernel, from a driver of said operating system, the data from said computer file corresponding to the FILE_OBJECT, and
        passing the data to user space of said operating system.

6. The computer program product of claim 5, wherein the handle is obtained by opening said computer file.

7. The computer program product of claim 6, wherein said computer file is opened by specifying no access and no sharing privileges.

8. The computer program product of claim 5, wherein said requesting comprises:
    generating within the kernel a PAGING READ input/output request packet corresponding to the FILE_OBJECT at a certain offset, which is an integral of the PAGE_SIZE, and of a certain length, which is the PAGE_SIZE; and
    passing the PAGING READ input/output request packet to said driver.

9. The method of claim 2, wherein said computer file is opened by specifying minimum access and minimum sharing.

10. The computer program product of claim 6, wherein said computer file is opened by specifying minimum access and minimum sharing.

* * * * *